United States Patent [19]

Lane et al.

[11] 4,083,568
[45] Apr. 11, 1978

[54] INJECTION MOLD

[75] Inventors: Eckel R. Lane; Kenneth J. Cleereman, both of Midland; John W. McLaren, Beaverton, all of Mich.

[73] Assignee: The Dow Chemical Company, Midland, Mich.

[21] Appl. No.: 670,316

[22] Filed: Mar. 25, 1976

[51] Int. Cl.² .............................................. F16J 15/34
[52] U.S. Cl. .................................. 277/81 R; 277/35; 277/83; 277/85; 277/101; 425/DIG. 47
[58] Field of Search .................. 277/81 R, 83, 85, 92, 277/96.1, 101, 35; 425/DIG. 47

[56] References Cited

U.S. PATENT DOCUMENTS

| | | | |
|---|---|---|---|
| 3,258,199 | 6/1966 | Anderson | 277/83 |
| 3,472,522 | 10/1969 | Winfrey | 277/83 |
| 3,500,503 | 3/1970 | Cleereman et al. | 277/96.1 |
| 3,507,504 | 4/1970 | Donley | 277/83 |

Primary Examiner—Richard E. Aegerter
Assistant Examiner—L. Footland
Attorney, Agent, or Firm—B. M. Halldorson

[57] ABSTRACT

An injection mold cavity is sealed at the mold parting line using a highly exact, narrow annular gap or clearance which restricts flash through of the molten plastic. The seal is designed for molds having a rotatable pin and comprises a fixed seating ring which seats with the mold cavity element, and a journable seal ring having a precisely machined seal face which is narrowly spaced from the lip of the mold cavity and defines the gap dimension with the assistance of the seating ring. The rings float at a unit against a resilient component which controls the seating pressure of the assembly independently of the clamping force of the mold. The foregoing components are unitized within a clamp ring under a preload compressive force with the critical gap dimension precisely built into the unit. Variable compressive loading of the seal assembly in the injection mold is counteracted by the resilient component and floating motion of the seal and seating rings whereby highly exact preciseness can be obtained in the critical gap dimension over prolonged operating periods.

5 Claims, 2 Drawing Figures

INJECTION MOLD

FIELD OF THE INVENTION

The invention relates generally to the field of injection molding of plastic articles. The invention more particularly relates to apparatus for sealing the mold cavity in injection molds of the type characterized by rotational movement of one of the mold elements during the injection molding cycle.

BACKGROUND OF THE INVENTION

Major property improvements are obtained in injection molded articles prepared using molds wherein one of the mold elements is rotated during and after the injection of the plastic into the mold cavity by the process described in U.S. Pat. No. 3,907,952. A difficult problem in constructing injection molds suitable for this process is in the forming of a good seal along the parting line of the mold to prevent flashing. For example, conventional seals formed between highly machined surfaces under clamping pressure are generally poorly adapted to this type of mold since the seal interface is not static.

U.S. Pat. No. 3,500,503 discloses that a gap seal, i.e., a seal formed by non-touching contact between closely adjacent surfaces, can be used effectively to seal an injection mold cavity. A technical drawback of a gap seal, however, is that exceedingly exact and reliable preciseness of the gap dimension is essential for commercial utility since a malfunction of the seal generally disables the mold.

Accordingly, it is an objective of the present invention to provide an improved seal of the type characterized by maintaining a gap of exceedingly fine tolerance and which effectively seals an injection mold cavity along the mold parting line in apparatus wherein one element of the mold is rotatable.

It is a further objective of this invention to provide such a seal assembly which is unitized and relatively easily installed and replaced to minimize maintenance problems related to seal malfunctions.

It is still a further objective of the invention to provide a seal structure of the described type which is preloaded under compression, and which may accept further loading and variances in the loading thereof in an injection mold caused by cyclic or other factors, with minimal tendency to disturb the critical dimension tolerance of the gap seal.

These and other objectives of the invention are obtained in a rotary seal and bearing assembly suited for use in an injection mold wherein one of the mold elements is rotatably driven, the rotary seal and bearing assembly comprising a seating ring, the seating ring being adapted to seat about the mold cavity at the mold part line, a seal ring having an annular sealing face within the seating face of the seating ring and being recessed therefrom to define a narrow annular gap with the peripheral edge of the mold cavity with the assistance of said seating ring, one of said rings being journable with respect to the other of said rings, said rings being floatable in the axial direction as a unit against a resilient member, and means for preloading the seating ring, seal ring and resilient member under a preload compressive force.

Other objectives, aspects, and advantages of the invention will in part be pointed out and in part apparent from the following description considered together with the accompanying drawing wherein:

FIG. 1 is a schematic and isometric view of injection molding apparatus embodying the rotary seal and bearing assembly constructed according to the principles and teachings of the invention, the mold in this view being in the open position, and FIG. 2 is a center line sectional view taken along reference lines 2—2 of FIG. 1, the mold in this view being in the closed position.

DESCRIPTION OF THE PREFERRED EMBODIMENT

Figure 1:
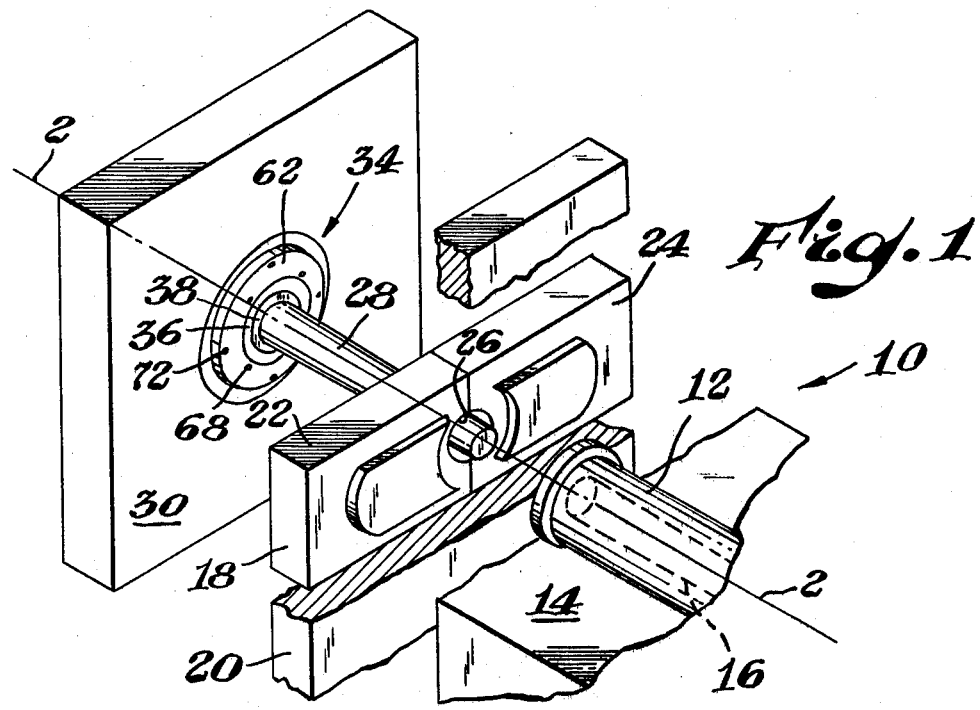
Figure 2:
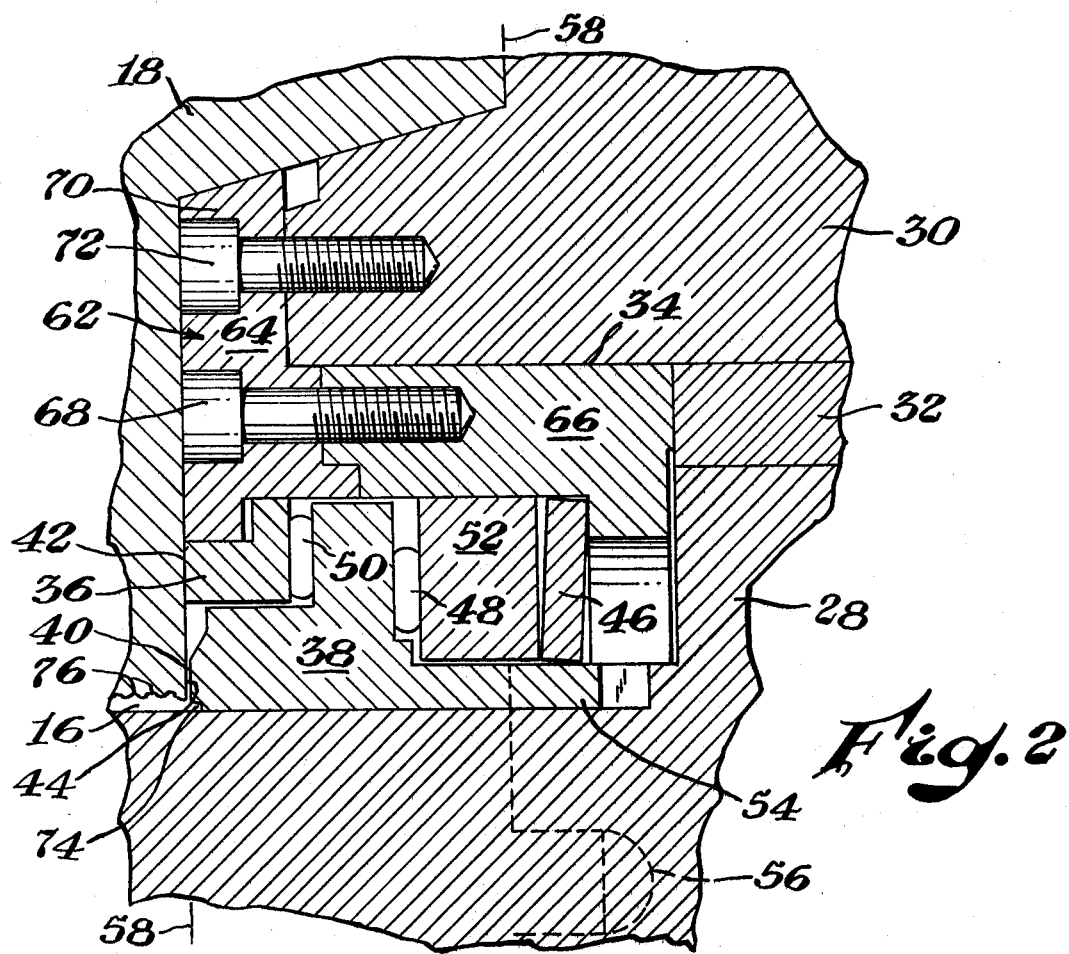

Referring to FIGS. 1 and 2 the drawing generally illustrates an injection molding apparatus 10 which comprises broadly a stationary cavity mold element 12 supported by a stationary die platen 14. The mold cavity element 12 defines a hollow mold cavity 16. A stripper plate 18, supported by a movable intermediate die platen 20, is slidable into seating contact with the cavity mold element. The stripper plate comprises separable halves 22, 24 which jointly define a central opening 26. The opening 26 forms a part of the mold cavity 16 in the closed mold position. A rotatable driven pin 28 is supported in a movable die platen 30 through means of a sleeve bearing 32, and is mated in design to the mold cavity. A rotary seal and bearing assembly 34 is fixed to die platen 30 about the base of the rotatable pin.

The critical sealing interface is formed along the mold parting line 58 between the stripper plate and the rotary seal and bearing assembly. The sealing of the mold cavity, along the remaining parting lines of the mold may be accomplished in the conventional manner, using machined surfaces, and high clamping pressures.

Referring now to FIG. 2, the rotary seal and bearing assembly comprises a non-rotatable or static or fixed seating ring 36 that is adapted to seat with the stripper plate about the periphery of the mold cavity, along the mold parting line 58, in the closed mold position. A seal ring 38 includes an annular sealing face 40 positioned concentrically within the seating face 42 of the seating ring, and which is recessed to define a gap most preferably of about 0.0005 inch with the peripheral edge 44 of the mold cavity. A non-rotatable resilient member or element 46 maintains a preloaded compressive thrust force on the seal ring, and through the seal ring, on ring 36 to control the seating pressure of seating face 42, as will be described in more detail hereinafter. The resilient element most preferably comprises one or more belleville springs, or a functionally equivalent element that is suited to provide a generally predictable recovery response or recovery response curve over a variable distance of compression.

A pair of bearings 48, 50 permit free journable movement of the seal ring with respect to the seating ring and resilient member, the latter through a non-rotatable spacer element 52 located between the resilient member and bearing 48. The journable seal ring is rotatably driven by pin through attachment thereto by key elements 54 which are integrated with the seal ring, and fit in keyways 56 defined by pin 28.

The foregoing assembly is unitized within a non-rotatable clamp ring 62, comprised of halves 64, 66. A plurality of clamping bolts 68 permit the inner half 66 of the clamp ring to be tightened against the outer half 64 in order to preload the rotary seal and bearing assembly under compression. The outer half 64 of the clamp ring further includes a radially outwardly positioned flange 70 for attachment of the rotary seal and bearing assembly to die platen 30 through bolts 72 (see also FIG. 1).

OPERATION

In the operation generally of injection mold 10, die platens 20, 30 close thus seating the stripper plate with the mold cavity element, the sealing and bearing assembly with the stripper plate, and mating the pin within the mold cavity. Plastic under high pressure is then injected into the mold cavity accompanied by rotation of the pin. After a suitable interval of time to allow the plastic cool, platens 20, 30 withdraw to the open position shown in FIG. 1, causing the stripper plate to pull or strip the molded article outwardly from the mold cavity and away from the pin. Thereafter, halves 22, 24 slide apart to release the molded article. The stripper plate performs the removal function by gripping threaded or other detail molded on the outer surface of the article and formed by corresponding threaded mold detail 76 defined in the central opening of the stripper plate. Most desirably in preparing molded articles adapted to accept a crimped cap or threaded closure, the seal ring beneficially defines an annular recess 74 immediately below sealing face 40. The annular recess extends the mold cavity slightly whereby the mold parting line is positioned backwardly from the extreme upper lip area of the finished molded article (see FIG. 2). A smoothly molded upper lip area (without any evidence of mold part line detail) is thus available for seating a cap or threaded closure element.

Referring now more specifically to the operation of the seal and bearing assemblies, reliable operation of mold 10 depends on maintaining, over long operating periods, a precise gap seal of between about 0.0001 to about 0.002 inch in width as described generally above. However, an effective gap seal at the extreme upper part of this range depends significantly on the condition of the polymer injected into the mold cavity. A gap dimension maintained at the very lower part of this range on the other hand creates a greater possible risk of grinding of the seal face against the stripper plate thus ruining the finely machined surfaces of these parts. The middle portion of this range is preferably practiced. The invention prefers the use of a gap seal in the range of about 0.0003 to 0.0005 inch for molding styrenic polymers as an illustrative example.

Once the proper gap clearance is built into the unitized sealing and bearing assembly, under the preload force, further and variable loading thereof in the machine, is accepted by floating movement, in the axial direction, of the seal and seating rings as a unit. The seating pressure is thus determined by the recovery response curve of the resilient component, independent of the clamping pressure of the mold. Accordingly, the resilient element relieves any pressure build up at the seating face that exceeds the recovery response, whereby an exacting preciseness of the critical gap dimension can be controlled over extended operating periods. Moreover, should the seal malfunction, its unitized design permits a replacement to be installed with a minimum amount of downtime and maintenance costs.

To assist the seal and bearing assembly from unnecessary compression loading, it is desirable that the same be mounted on the pin in a manner that permits slight movement of the pin with respect to the seal and bearing assembly in the axial direction. This is readily achieved by use of keys and keyways that permit slight movement of the pin in the axial direction with respect to the seal and bearing assembly. Since the pin is subjected to high injection pressures, therefore, which can cyclically compress the steel of the pin as for example as high as 0.0015 inch, this compression is nevertheless not transferred to the rotary seal and bearing assembly if constructed as described above thereby assisting the rotary seal and bearing assembly to maintain a high degree of precision in the gap seal dimension.

The rotary seal and bearing assembly as described above is readily suited to injection molds wherein the cavity element rather than the mold pin is designed as the rotatable element or for use in a two part mold, rather than the three part mold design illustrated. In these cases, of course, suitable design modifications would be implemented to adapt these teachings to such a mold structure without departing from the scope of this invention.

What is claimed is:

1. An injection mold comprising a plurality of mold elements, a first one of said elements having a mold cavity with a peripheral edge defining a seal face, a second of said elements receivable in and defining the mold cavity, means for rotating at least one of said first and second mold elements with respect to the other, a cartridge seal assembly, said assembly comrpising a seating ring component having a face seating with the mold seal face, a seal ring component with an annular seal face spaced radially inward from the seating ring component and axially displaced inwardly from said seating face and defining a narrow annular seal gap between the relatively rotatable annular seal face and mold seal face, a resilient component means within said assembly biased between a third mold element and the seal ring component, means for journeying said seating ring component with respect to said seal ring component, means for clamping together the assembly components and compressively preloading said resilient component means axially against said ring components, means clamping the cartridge assembly to the third mold element whereby the seal gap dimension is maintained by the cartridge assembly despite variations in the clamping pressure between the first and third mold elements.

2. The injection mold of claim 1 wherein said preloading means comprises a clamp ring.

3. The injection mold of claim 1 wherein said assembly includes means to provide journable movement of said seal ring component and said resilient component means.

4. The injection mold of claim 1 wherein said assembly includes a non-rotatable spacer component between said resilient component means and said seal ring component.

5. The injection mold of claim 1 wherein said journeying means includes bearings.

* * * * *